INVENTOR.
HANNAH DUNMIRE, Executrix
of the estate of RUSSELL P.
DUNMIRE, deceased
BY Ely, Pearne & Gordon
ATTORNEYS

3,105,507
FLUID RELIEF VALVE
Russell P. Dunmire, deceased, late of Chagrin Falls, Ohio, by Hannah Dunmire, executrix, 29550 Pike Drive, Chagrin Falls, Ohio
Filed Nov. 13, 1961, Ser. No. 152,095
2 Claims. (Cl. 137—73)

The present invention relates to a fluid relief valve, and more particularly to a diaphragm-type relief valve operable under excessive pressure and which may include means for releasing fluid at abnormal temperatures.

This application is a continuation-in-part of copending application Serial No. 832,250, filed August 7, 1959, now abandoned.

Conventional diaphragm-type, fluid relief valves are of a complex character employing springs for loading the diaphragm. Valves containing springs as loading members have been found functionally objectionable for a variety of reasons, one of which being that even though packing is used in the valve, the springs are subject to deterioration by corrosion. Additionally, as the spings weaken through use, it becomes increasingly difficult to accurately load the diaphragm.

The present invention obviates these and other disadvantages by providing a non-corrosive, fluid relief valve, the diaphragm of which is pre-stressed by a rigid, adjustable backing member instead of springs and which is designed to flex within its elastic limit thus serving as its own spring. The invention further contemplates the incorporation into the pressure-responsive relief valve of a temperature-sensitive release means for opening the valve under abnormal temperatures.

Accordingly, it is an object of the invention to provide a fluid relief valve which is non-corrosive.

Another object is the provision of an inexpensive fluid relief valve having a minimum number of parts and which is operable under excessive pressure and/or abnormal temperature.

Another object is to provide a diaphragm-type relief valve which employs a diaphragm flexible within its elastic limit and which serves as its own spring.

More specifically, it is an object of the invention to provide a non-corrosive, fluid relief valve which is opened by flexing of a diaphragm away from a normal position and is closed by movement of the diaphragm under its own tension toward a normal position.

Still another object of the invention is the provision of an inexpensive relief valve employing a pre-stressed diaphragm flexible within its elastic limit under excessive pressure.

Other objects and many of the attendant advantages of this invention will be readily appreciated as the same becomes better understood by reference to the following detailed decription when considered in connection with the accompanying drawings wherein.

Figure 1:
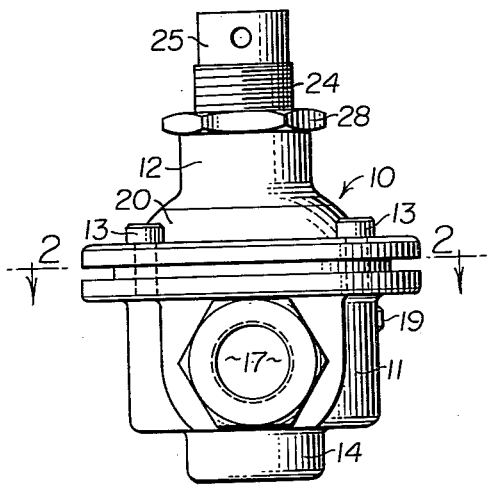
FIG. 1 shows a side elevation of the invention.
Figure 2:
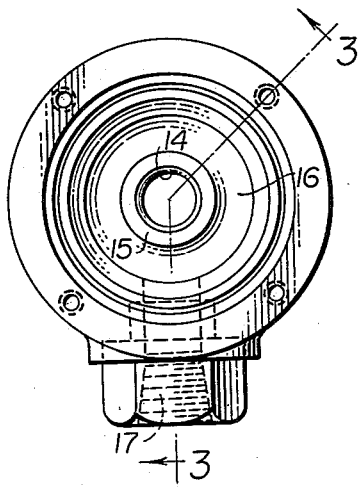
FIG. 2 is a top view of the valve body taken along the line 2—2 of FIG. 1 looking in the direction of the arrows with the diaphragm removed for clarity.

Referring to the drawings there is shown a valve casing 10 comprised of a body section 11 and a top section 12, the top and body being secured together by bolts 13 threaded into peripheral flanges on the sections. The body and top sections are preferably formed from a non-corrosive plastic material although they may be made from any suitable metal such as brass or the like. In the case of the plastic valve casings shown in the drawings, the peripheral flanges may be formed with metal inserts as shown at 20 in order to avoid possible cracking or undue flexing of the plastic flanges when bolts 13 are tightened.

The valve body 11 has an inlet port 14, threaded on its interior to receive a pipe or conduit fitting and terminating within the body in an annular valve seat 15. The interior of the body is formed so as to have an annular groove 16 surrounding the valve seat, there being an outlet port 17 communicating with the groove and having its outer end interiorly threaded to receive a pipe or conduit. The sidewall of the body 11 has a threaded aperture 18 adapted to receive a plug screw 19 which extends into an axially aligned aperture or plug seat 21 in the valve seat 15.

Figure 3:
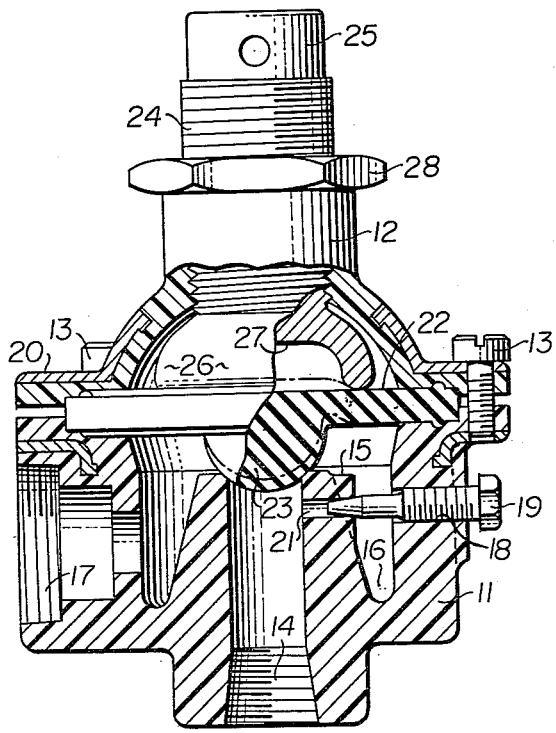
FIG. 3 is a vertical section of the entire valve structure of FIG. 1 but taken along the lines 3—3 of FIG. 2 looking in the direction of the arrows.
Figure 4:
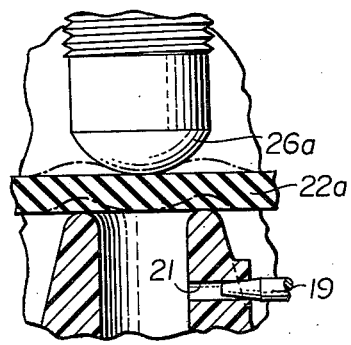
FIG. 4 is a side elevation of a modification of the invention.

A flexible obturator or diaphragm 22, preferably formed from either an elastic plastic or rubber-like material capable of being pre-stressed within its elastic limit and having good memory characteristics, is peripherally secured between the flanges of the top and body sections. In its preferred embodiment the diaphragm has a hemispherically shaped center portion 23 designed to engage the valve seat in its normal position as shown in FIG. 3. Referring to FIG. 4 a modification of the diaphragm is shown at 22a in which the hat-shaped or hemispherical center section is eliminated.

The top section 12 is internally threaded to receive a rigid, adjustable backing member 24 having one end 25 protruding from the casing and the other end 26 engaging the diaphragm whereby the diaphragm may be pre-stressed and biased into its normal position against the valve seat. Inasmuch as member 24 is never in contact with the fluid passing through the valve because of the interposition of the diaphragm, element 24 is not subject to attack by corrosion as are biasing means in many conventional valves. Preferably, the inner end 26 of member 24 is centrally relieved, forming a recess 27 into which the diaphragm is free to flex, as shown by a dot-dash line in FIG. 3, under excessive fluid pressure in port 14. Instead of having the member 24 engage the diaphragm outwardly and concentrically of the valve seat whereby the flexing of the central portion 23 uncovers the valve seat, it is possible to construct member 24 with a hemispherically shaped inner end 26a so that it engages the diaphragm in substantially point contact within the circumference of the valve seat (see FIG. 4). With the inner end 26 modified as shown at 26a in FIG. 4, the portions of the diaphragm radially outwardly of the engaging surface of the backing member will flex upwardly, as shown by dot-dash lines, thereby relieving excessive pressure in the inlet port 14.

In operation the backing member 24 is screwed inwardly so that the end 26 stresses the diaphragm into engagement with the valve seat thereby closing the passageway comprised of the groove 16 and the valve seat opening and preventing communication between the inlet and outlet ports. Preferably, a pressure gage is placed in the conduit connecting with the inlet port and, when a desired pressure is reached, the backing member is locked into place by a lock nut 28 threadedly engaged with end 25. Any pressure in excess of the predetermined amount will cause the diaphragm to flex upwardly within its elastic limit thereby uncovering the valve seat and allowing fluid to pass through the outlet port. When the inlet pressure has been reduced to the predetermined setting, the energy stored in the diaphragm will cause it to reseat itself, closing off all flow of fluid through the valve until the inlet pressure again increases.

In many applications, such as when the valve is connected to a hot water tank, it is necessary to afford relief at normal pressure when abnormal temperatures are encountered since under these conditions the tank may suddenly explode because of an abrupt pressure increase which cannot be accommodated by the pressure release means of the valve.

Therefore, a fusible plug having a proper melting point may be inserted in the plug seat 21 and held seated by the plug screw 19 screwed into aperture 18. When the temperature of the fluid in the inlet melts the plug, relief will be afforded through the plug seat, groove 16 and the outlet port, thus bypassing the pressure relief means.

Obviously, many other modifications and variations of the present invention are possible in light of the above teachings. It is therefore to be understood, that within the scope of the appended claims, the invention may be practiced otherwise than as specifically described.

What is claimed is:

1. A relief valve comprising a casing defining a valve chamber and inlet and outlet ports therefor, said inlet port comprising an annular valve seat within said chamber, a flexible diaphragm within said valve chamber and secured to a portion of said casing for engagement with said seat to close said inlet port, a rigid backing member adjustably mounted on said casing for movement relative to said portion and for movement toward and away from said valve seat, said backing member engaging said diaphragm only at points radially offset relative to said annular valve seat for prestressing said diaphragm within its elastic limit and biasing it against said seat to close said inlet port, said diaphragm being free to flex between the points of engagement by said backing member and its points of engagement with said seat when said backing member is in a fixed adjusted position relative to said casing for disengagement from said valve seat to open said inlet port in response to a pressure differential between said inlet port and said chamber.

2. A relief valve according to claim 1 in which said valve seat defines an inlet passageway from said inlet port to said chamber, said valve including temperature responsive means disposed between said inlet passageway and said chamber for establishing fluid communication between said inlet and outlet ports in response to a change in temperature, said temperature responsive means including means defining an aperture between said inlet passageway and said chamber, a fusible plug extending from the outside surface of said casing, through said casing and into said aperture.

References Cited in the file of this patent

UNITED STATES PATENTS

| 963,045 | Hulse | July 5, 1910 |
| 1,515,999 | Clark | Nov. 18, 1924 |
| 1,972,171 | Spencer | Sept. 4, 1934 |
| 2,842,400 | Booth et al. | July 8, 1958 |
| 2,966,928 | Fairchild | Jan. 3, 1961 |

FOREIGN PATENTS

| 48,424 | Germany | Jan. 26, 1889 |